(12) United States Patent
Nicot

(10) Patent No.: US 6,517,113 B1
(45) Date of Patent: *Feb. 11, 2003

(54) STEERING COLUMN WITH TORQUEMETER

(75) Inventor: Christophe Nicot, Epagny (FR)

(73) Assignee: S.N.R. Roulements, Annecy Cedex (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/601,636

(22) PCT Filed: Feb. 3, 1999

(86) PCT No.: PCT/FR99/00228

§ 371 (c)(1),
(2), (4) Date: Sep. 28, 2000

(87) PCT Pub. No.: WO99/39965

PCT Pub. Date: Aug. 12, 1999

(30) Foreign Application Priority Data

Feb. 4, 1998 (FR) .................................. 98 01292

(51) Int. Cl.⁷ .............................. B62D 1/00; G01L 3/02
(52) U.S. Cl. .............. 280/771; 73/862.321; 73/862.325
(58) Field of Search ......................... 280/771; 180/400, 180/412, 443, 446; 73/862.321, 862.325

(56) References Cited

U.S. PATENT DOCUMENTS 4,532,567 A * 7/1985 Kade
4,984,474 A * 1/1991 Matsushima et al.
5,009,110 A * 4/1991 Lang et al.
5,195,383 A * 3/1993 Tanaka et al.
5,237,880 A * 8/1993 Dobler et al.
5,450,761 A * 9/1995 Zilberman et al.
5,501,110 A * 3/1996 Peilloud et al.
5,731,529 A * 3/1998 Nicot
6,190,264 B1 * 2/2001 Al-Rawi

FOREIGN PATENT DOCUMENTS

| EP | 0442091 A1 | 8/1991 |
| EP | 0775624 A2 | 5/1997 |
| FR | 2478004 | 9/1981 |
| FR | 2718699 | 10/1995 |
| WO | WO 97/08527 | 3/1997 |

* cited by examiner

Primary Examiner—Paul N. Dickson
Assistant Examiner—Joselynn Y Sliteris
(74) Attorney, Agent, or Firm—Perman & Green, LLP (57) ABSTRACT

The invention concerns a vehicle steering column (2) comprising a manual control member (3) for applying a torque on the column (2) drive shaft (8), the column being equipped with a device for measuring the torque applied to the drive shaft (8), characterised in that the torque measuring device includes a sensing element without requiring a torsion bar to be located along the drive shaft (8) axis and thus producing a break therein.

17 Claims, 7 Drawing Sheets

STEERING COLUMN WITH TORQUEMETER

BACKGROUND OF THE INVENTION

1. Field of the Invention

The invention relates to the technical field of vehicle steering columns. Steering column conventionally means a tubular element, fixed to the body of the vehicle, under the dashboard, which guides and supports the drive shaft connected to the steering wheel.

This steering wheel is then a manual control member, connected to the steered wheels and used by the driver to steer the vehicle.

2. Description of the Prior Art

The invention also concerns decoupled steering columns. Unlike conventional steering columns, decoupled steering columns are not associated with a steering box converting the circular movement of the steering wheel into angular displacement of the steering rod which brings about turning of the wheels.

On the contrary, for these decoupled steering systems, there is no direct mechanical link between the steering wheel and the wheels resting on the ground, whether the vehicle is real or belongs to a simulation system.

This simulation can be for play purposes, connected with training in driving schools or perhaps connected with an interactive driving simulation for the requirements of motor vehicle manufacturers.

In such simulators, the restitution of forces at the steering wheel by virtue of a mechanism generating a load torque on the steering wheel according to the type of vehicle to be simulated, whether or not fitted with power-assisted steering, must take into account the driving conditions to be recreated.

Measurement of the torque applied to the steering wheel is consequently essential for providing a good simulation, in real time.

Measurement of the torque on the steering wheel shaft is also very important in servo-or power-assisted steering.

This is because initiation of the assistance depends notably on the torque applied by the driver on the steering wheel.

The torquemeter, or torque sensor, used in servo-steering outputs a signal indicative of the turning torque exerted by the driver on the steering wheel and therefore on the drive shaft of the vehicle steering column.

This signal is conventionally sent to a steering assistance computer which initiates the assistance, by controlling for example an electric motor, in the case of electric servo-steering.

The majority of torquemeters comprise a torsion bar.

Under isotropic linear elasticity, the torque exerted in terms of pure torsion on a solid cylindrical bar of circular section varies, for a given material, as a function of the fourth power of the diameter of the bar, at a fixed angle of torsion.

Consequently, the fact of making an area of reduced cross section in the steering column allows a concentration and amplification of torsional deformation in this area, used for measuring the torque, to the detriment of the rigidity and mechanical strength of said torsion bar.

Examples of torsion bar torquemeters for servo-steering can be found in the following documents:

WO-97 08 527, EP-453 344, EP-325 517, FR-2 738 339 originating from the applicant, as well as in the following other documents:

patent applications in Japan published under numbers JP-43 17 862, JP-50 77 743, JP-57 19 81 71, JP-59 07 58 64, JP-57 08 77 62, JP-59 11 85 77, JP-61 14 674, JP-62 13 43 71, JP-62 09 44 70, JP-63 29 037, JP-63 09 36 73, JP-30 79 473;

European patents published under numbers EP-369 311, EP-396 895, EP-418 5 763, EP-515 052, EP-555 987, EP-562 426, EP-566 168, EP-566 619, EP-652 424, EP-638 791, EP-673 828, EP-681 955, EP-728 653, EP-738 647, EP-765 795, EP-738 648, EP-770 539, EP-802 107;

PCT international patent applications published under numbers 87/02 319, WO-92/20 560, WO-95/19 557, WO-96/06 330;

patent applications in France, the United Kingdom and the United States published under the following numbers: GB-2 306 641, FR-2 705 455, U.S. Pat. Nos. 4,874,053, 4,907,668, 4,984,474, 5,123,279, 5,394,760, 5,515,736, 5,578,767, 5,585,573, 5,616,849, 5,641,916.

Torsion bar torquemeters are large in size. Their installation requires two additional bearings to lessen notably spurious flexion effects.

The document FR-2 724 018 relates to a torque sensor comprising an elongation measurement gauge device. This gauge device is disposed on a measuring body, subject to mechanical tensions under the action of a torque.

The document EP-442 091 describes an installation for measuring the angle of rotation or the torque of a rotary or fixed element of a machine, having a torsion element in the form of a spoked wheel connected to a number of measuring elements, at least one spoke of the spoked wheel being cut so that the parts of the spoke or spokes are applied one against the other upon the displacement by a predetermined flexion of the other spokes. The measuring device uses eddy currents.

SUMMARY OF THE INVENTION

The invention relates to a torque measurement system not having the drawbacks of the systems known in the prior art for steering columns and capable of being installed, possibly reversibly, at any point on the steering column, this device being insensitive to electromagnetic interference and being rigid, consisting of a single piece, with high inertia and of small size and low cost.

To that end, the invention relates to a vehicle steering column comprising a manual control member for applying a torque on the drive shaft of the column, said column being provided with means for measuring the torque applied to said drive shaft, said measuring means comprising a sensing element with no torsion bar placed along the axis of the drive shaft and producing a break therein.

In one embodiment, the column is of the decoupled type.

In another embodiment, the column has a steering box converting the rotating movement of the drive shaft into angular displacement of the steering rod which brings about turning of the wheels.

The column has assistance means whose initiation depends notably on the torque applied to the drive shaft by operation of the control member.

Assistance calculation means are provided, sending signals to the means for controlling the assistance means, depending on the turning torque applied to the drive shaft.

The means for measuring the torque applied to the drive shaft are formed from an assembly having a certain rigidity comprising:

a displaceable first outer ring;

a second outer ring, substantially unstressed, placed at a distance from the displaceable outer ring;

an inner ring immovably attached rotation-wise to a column on which the torque to be measured is applied, the displaceable outer ring being capable of being immovably attached rigidly to the means applying the torque to be measured on the column, the displaceable outer ring being assembled with the inner ring by at least one elastically deformable means;

the substantially unstressed outer ring being assembled with the inner ring by at least one substantially unstressed means;

the sensor comprising means of measuring the small relative displacement of the displaceable outer ring with respect to the substantially unstressed outer ring when a torque is applied on the column by the means.

Other objects and advantages of the invention will emerge during the following description of embodiments, a description which will be given with reference to the accompanying drawings, in which:

DETAILED DESCRIPTION OF THE PREFERRED EMBODIMENTS

Figure 1A:
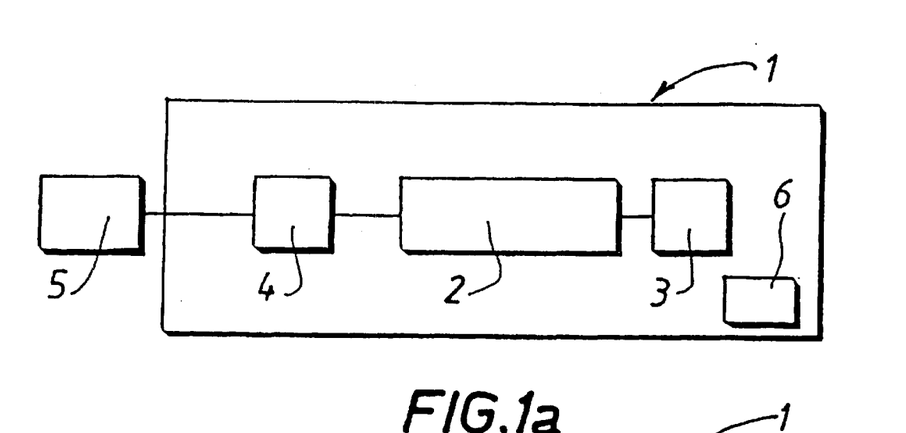
FIGS. 1a and 1b are block diagrams of vehicle steering systems comprising a torque measurement system according to the invention.
Figure 1B:
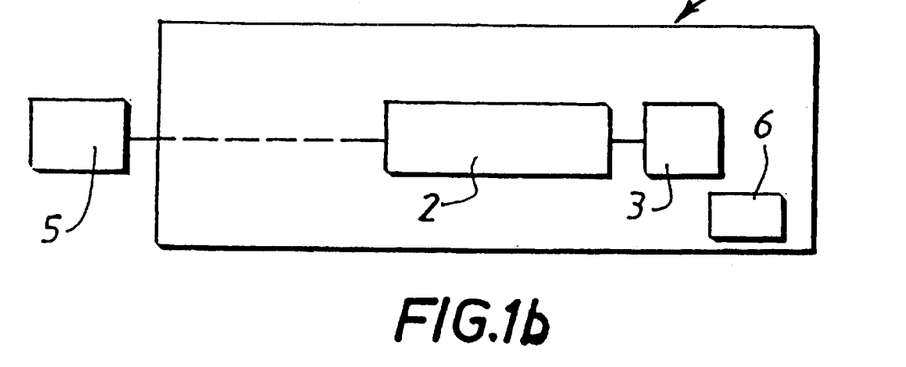

Reference is made first of all to FIG. 1

The steering device 1, a block diagram of which is depicted in FIG. 1, is intended to be incorporated into a vehicle, for example a motor car.

This device 1 comprises a steering column 2. This column 2 can be telescopic, as applicable, and/or of variable inclination with respect to the vehicle body and the driver.

A steering wheel 3 is associated, possibly so as to be removable, with this steering column.

Steering wheel means a manual control member used by the driver to steer the vehicle.

In one embodiment, the steering column 2 is associated with a steering box 4, for example a rack, converting the circular movement of the steering wheel 3 into angular displacement of the steering rod which brings about turning of the wheels 5.

This embodiment corresponds to diagram a) of FIG. 1.

In another embodiment, the wheels 5 are not connected by a series of mechanical elements with the steering wheel 3. The steering is then referred to as decoupled.

This embodiment corresponds to block diagram b) of FIG. 1.

A torque measurement system 6 is associated with the steering device 1. As this torque measurement system is capable of being installed, possibly so as to be removable, at any point of the steering device, no one-to-one link has been depicted between this measurement system 6 and the different elements of the steering device 1 in the block diagrams of FIG. 1.

Figure 2:
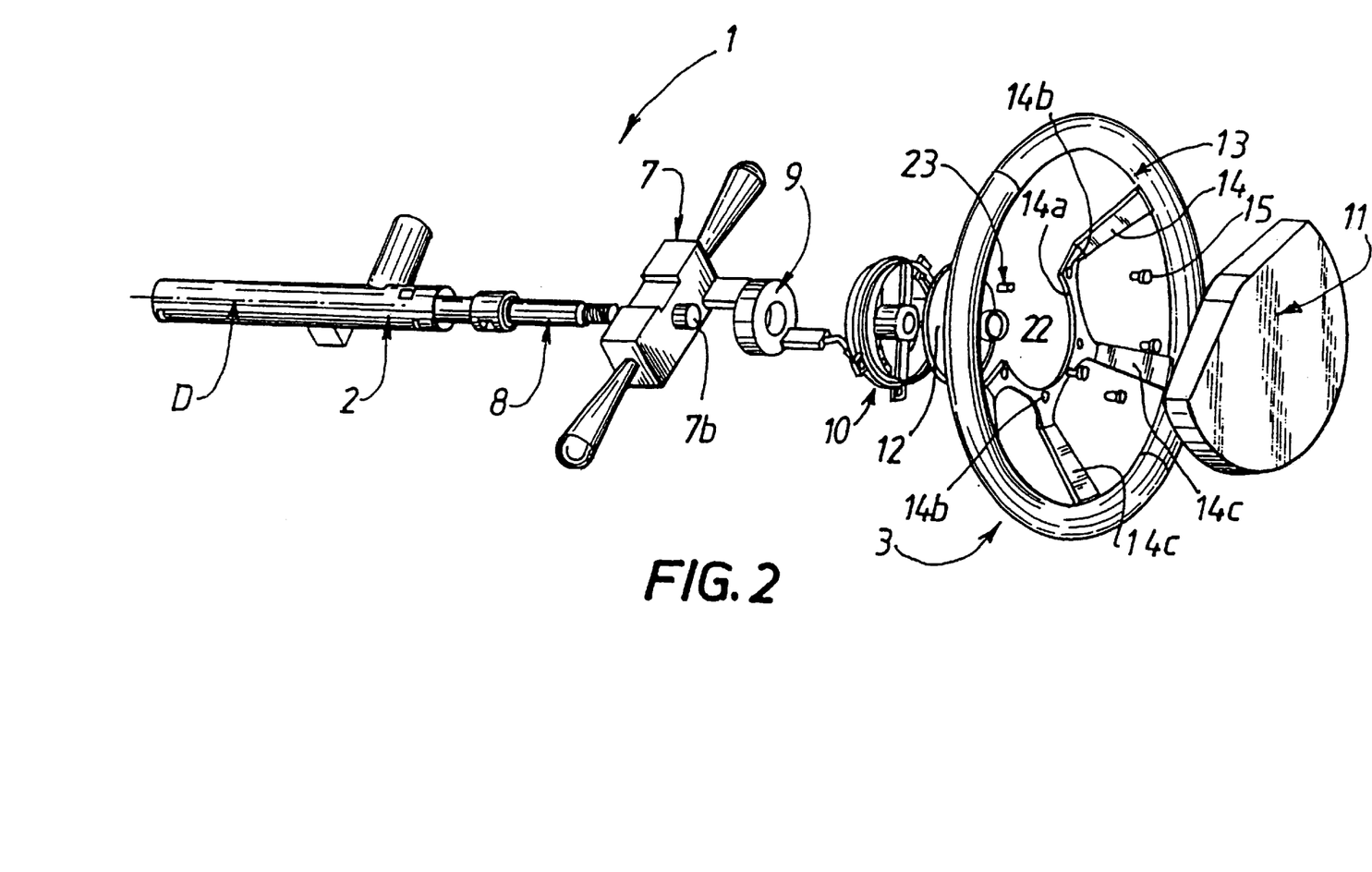
FIG. 2 is an exploded perspective view of a steering column having a torque sensor with flexion sensing element, integrated with the steering wheel, according to one embodiment of the invention.

Reference is now made to FIG. 2 which is an exploded perspective view of a steering column having a torque sensor with flexion sensing element, added on to the steering wheel, according to one embodiment.

The steering device 1 depicted in FIG. 2 has a control assembly 7 under the steering wheel.

The control assembly 7 under the steering wheel comprises a central block having a through hole 7b of diameter such that the assembly 7 can be fitted on the drive shaft 8 of the steering column 2.

In the present embodiment, the end part of the drive shaft is of substantially circular cross section, the through hole 7b also being circular in cross section, i.e. perpendicular to the main axis D of the steering device 1.

The steering device 1 comprises a rotary connector 9 provided with two pins and a central through hole.

The steering device 1 also comprises a torquemeter whose sensing element is added into the hub 10 of the steering wheel 3.

As applicable, as depicted in FIG. 2, the steering wheel 3 has in its central part an air-bag casing 11.

In this case, the rotary connector 9 can serve as both the connection for the airbag casing 11 and the connection between the electronic circuit 12 of the servosteering torquemeter and the assistance means.

In other embodiments, the steering device 1 has no air-bag casing.

The steering wheel 3 has a rim 13 and a frame 14.

In the embodiment depicted, the frame 14 appears in the form of a transverse arch 14a connected to the rim 13 by four inclined arms 14c.

The transverse arch 14a has through holes 14b made in it, allowing the passage of screws 15 for fixing-the hub 10 on the steering wheel 3.

The hub 10 will now be described with reference to FIGS. 3 onwards.

Figure 3:
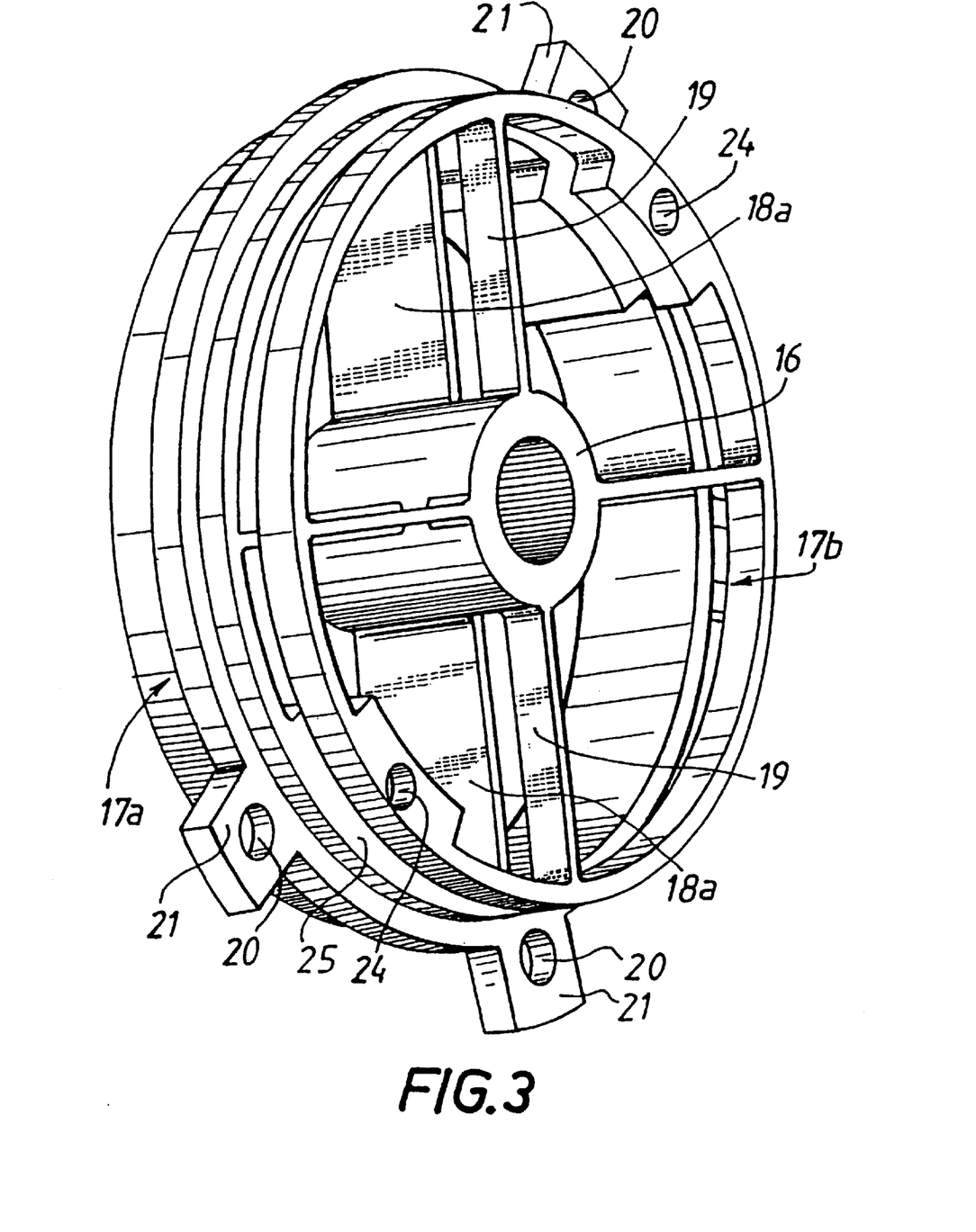
FIG. 3 is a perspective view of the sensing element depicted in FIG. 2.
Figure 4:
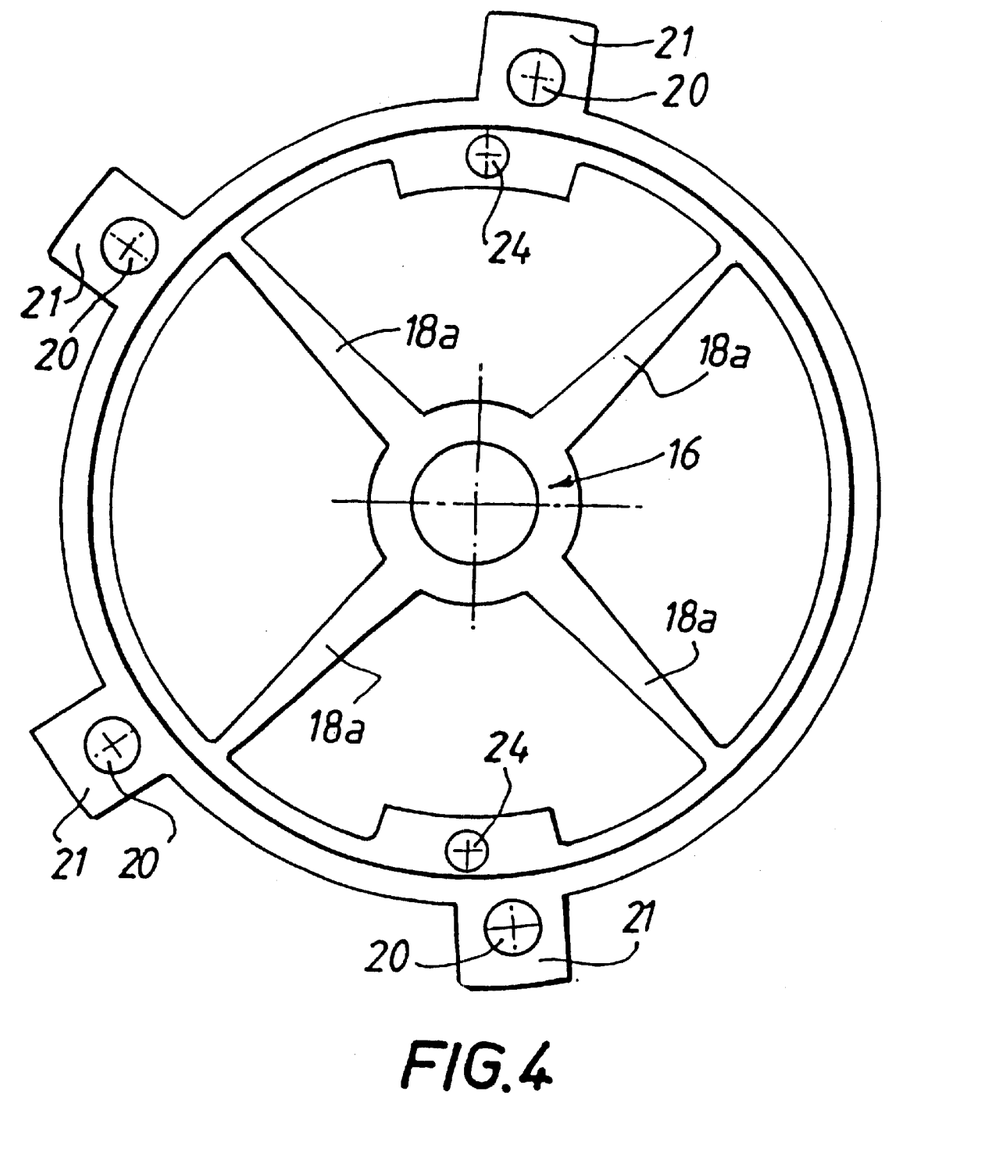
FIG. 4 is a front view of a flexion sensing element capable of taking the place of that depicted in FIGS. 1 and 2.

In the embodiment depicted in FIG. 3, the hub 10 comprises a flexion sensing element.

A cylindrical inner ring 16 and two outer rings 17a and 17b are connected by elastic braces deformable flexion-wise 18a and non-deformed braces 19. More precisely, the rear outer ring 17a, fixed to the hub 10 of the steering wheel 3 by screws 15 passing through holes 20, is connected to the inner ring 16 by means of elastic braces deformable flexion-wise 18a.

In the embodiment depicted, there are 4 of these deformable braces 18a, evenly distributed, perpendicular to the main axis D.

The front outer ring 17b is connected to the inner ring 16 by means of nondeformed radial braces 19.

In the embodiment depicted, there are the same number of these non-deformed braces 19 as there are braces elastically deformable flexion-wise 18a, the braces 18a, 19 being situated substantially along two radial planes perpendicular to the main axis D.

In other embodiments, not depicted, there are two, three or four braces 19.

In other embodiments, not depicted, the outer ring 17b is connected to the inner ring by a plate or an annular wall.

The deformable outer ring 17a of the hub 10 is rigidly linked to the arch 14a of the steering wheel 3, the screws 15 passing through the holes 14b of the arch 14a in order to reach the holes 20 provided in the fixing lugs 21 of the outer ring 17a.

At the same time, a screw 22 fixes the steering wheel 3 on to the column 2, the control assembly 7 under the steering wheel, the rotary connector 9, and the hub 10 being sandwiched between the arch 14a of the steering wheel 3 and the steering column, over a length corresponding to the end p art of the drive shaft 8 of the column 2.

The electronic circuit 12 is added on, or affixed, to the hub 10.

When the driver exerts a force on the rim 13 of the steering wheel 3, the rear outer ring 17a immovably attached to the steering wheel 3 brings about a flexion-wise deformation of the braces 18a, said deformation being all the greater, the larger the load torque on the column 2.

As for the front outer ring 17b, this remains substantially unstressed.

Its position can consequently serve as a reference basis for measuring the displacement of the rear outer ring 17a.

The front outer ring 17b carries sensors 23 of small displacements. These sensors perform a local detection and a variable number thereof can be disposed.

In the embodiment depicted, there are two of these sensors 23 and they are disposed in housings 24 made in the front ring 17b, in line with the rear ring 17a.

These sensors 23 can be of any suitable type: optical, capacitive, electromagnetic, magnetoresistive, etc. sensors.

In one embodiment, these are Hall effect sensors. The magnetic field generators then have, in on e emb odime nt, a magnetized structure with antiparallel magnetization directions and are immovably attached to the drive shaft of the steering column. The Hall probes thus deliver a signal proportional to the torsional torque as a result of the relative angular shift of the field generators with respect to the probes.

Each field generator can be constituted by two parallel-epipedal magnets contiguous along one of their lateral faces, the respective induction vectors being of opposite senses, perpendicular to said attachment face.

In another embodiment, these sensors are magnetoresistive (MR) or giant magnetoresistive (GMR) sensors.

Although a single Hall effect probe 23 is sufficient for measuring small displacements, a number of probes can, for reasons of reliability, be disposed in the measurement air gap 25 in order to create redundancy.

Each of the Hall effect probes 23 can have its own associated electronic circuit.

By comparison or combination of the signals delivered by 2, 3 or 4 different probes, it is possible to detect any failure of one of the probes and provide the torquemeter with excellent reliability.

The thickness, length and width of the braces, as well as their number, their angular distribution, and the material used to make them, influences, as will be clearly apparent to persons skilled in the art, the following characteristics:

moment of inertia;

maximum stress in the braces, for a given maximum torque, for example breaking stress;

value of the measurable minimum torque, for a technique of measuring given small displacements.

As applicable, means can be provided to limit the displacement of the ring 17a. For example, two limit stop braces can extend radially in a transverse direction from the inner ring 16 to the deformable ring 17a.

These limit stops make it possible, as applicable, to avoid a plastic deformation of the braces 18a.

The sensing element can be made out of a material chosen from amongst the group comprising: steel, cast iron, aluminium alloys, magnesium alloys.

A 35NCD16 steel, a spheroidal graphite iron, or a 7000 series aluminium can for example be considered.

The sensing element can be cast or machined, depending on the material used, the geometry of the braces, and the acceptable cost notably, as will be apparent to persons skilled in the art.

When the sensing element is cast in aluminium or in magnesium alloy, the casting can be performed with a metal insert having grooves for mounting the sensing element on the drive shaft 8.

Figure 5:
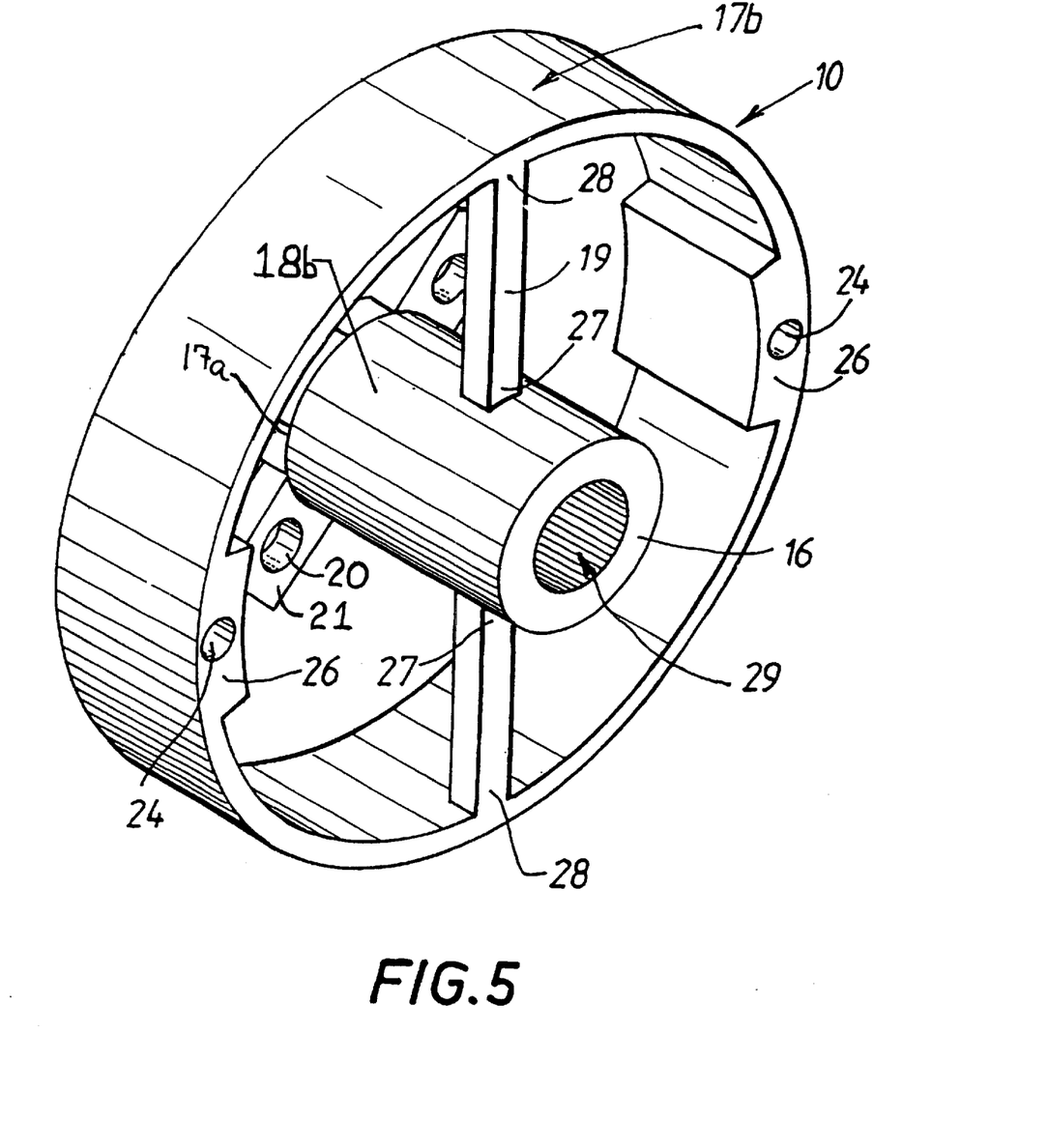
FIG. 5 is a view of a torsion sensing element capable of taking the place of the sensing elements depicted in FIGS. 1 to 4.

Reference is now made to FIG. 5 which illustrates one embodiment of a torsion sensing element hub.

The hub 10 has an unstressed outer ring 17b, with a substantially cylindrical outer peripheral surface.

This ring 17b is provided with two housings 24, made in two diametrically opposite areas of extra thickness 26.

Between these areas of extra thickness 26, the inner surface of the ring 17b is substantially cylindrical.

The ring 17b is assembled with the inner ring 16 by at least one brace 19, a plate or equivalent.

In the embodiment depicted, two radial braces 19, made in one piece with the inner ring 16 and the unstressed outer ring 17b, link these two rings 16, 17b.

These braces 19 are, in the embodiment depicted, of square section substantially constant from their foot 27 to their head 28 and are substantially aligned.

The inner ring 16 has a through hole defining a grooved fixing sleeve 29 and, on the opposite side, a surface 30 for resting on the end part of the drive shaft 8, when the sensing element is intended to be incorporated at the end part of the drive shaft 8.

A tube, deformable torsion-wise, 18b connects the inner ring 16 to the displaceable outer ring 17a.

As applicable, this tube can be punched axially, the axial openings thus made separating braces deformed under axial torsion.

This displaceable outer ring 17a is assembled rigidly with the hub applying the torque to the drive shaft 8, namely the steering wheel 3.

Figure 6:
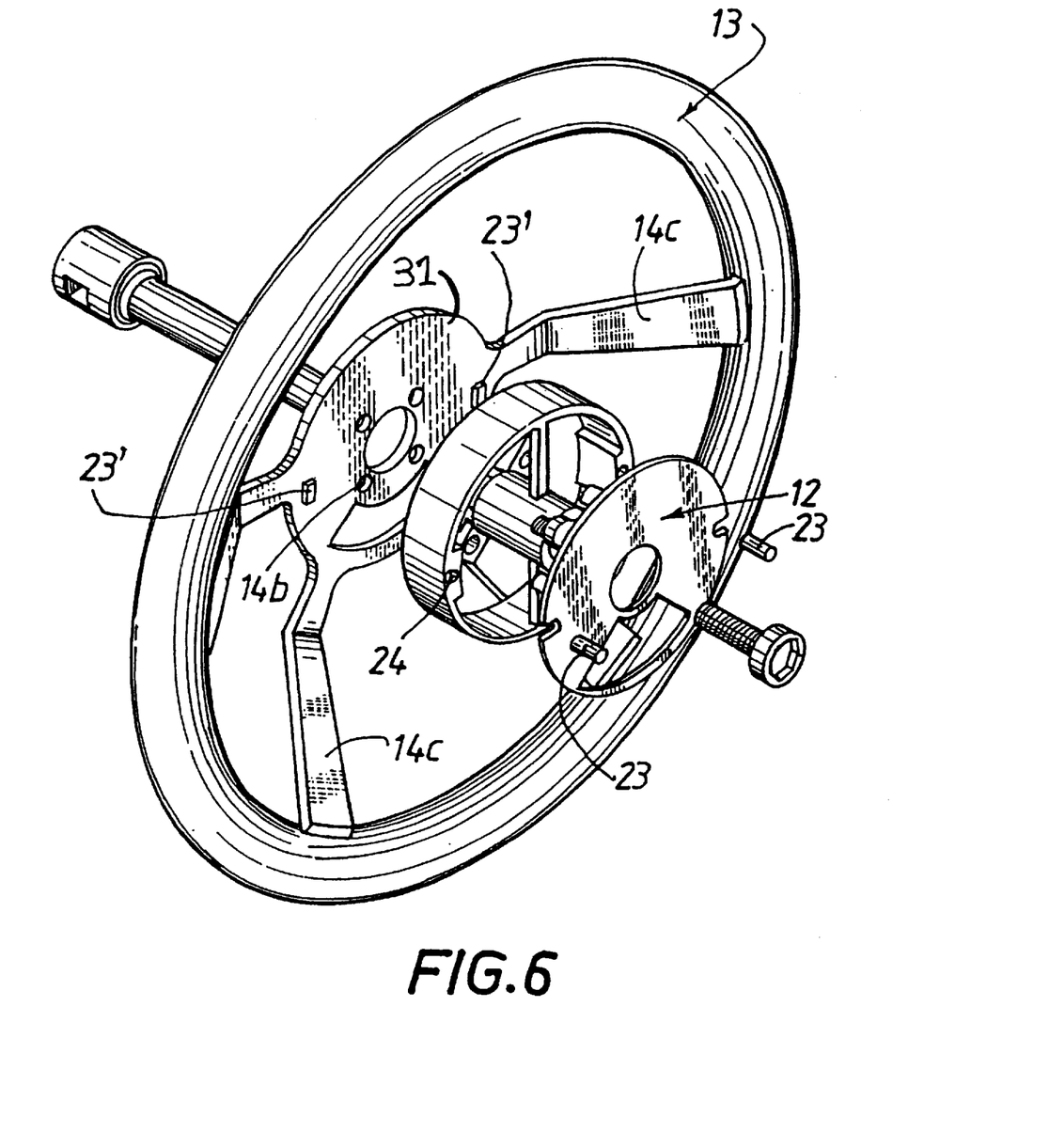
FIG. 6 is an exploded perspective view of a vehicle steering column comprising a sensing element as depicted in FIG. 5.
Figure 7:
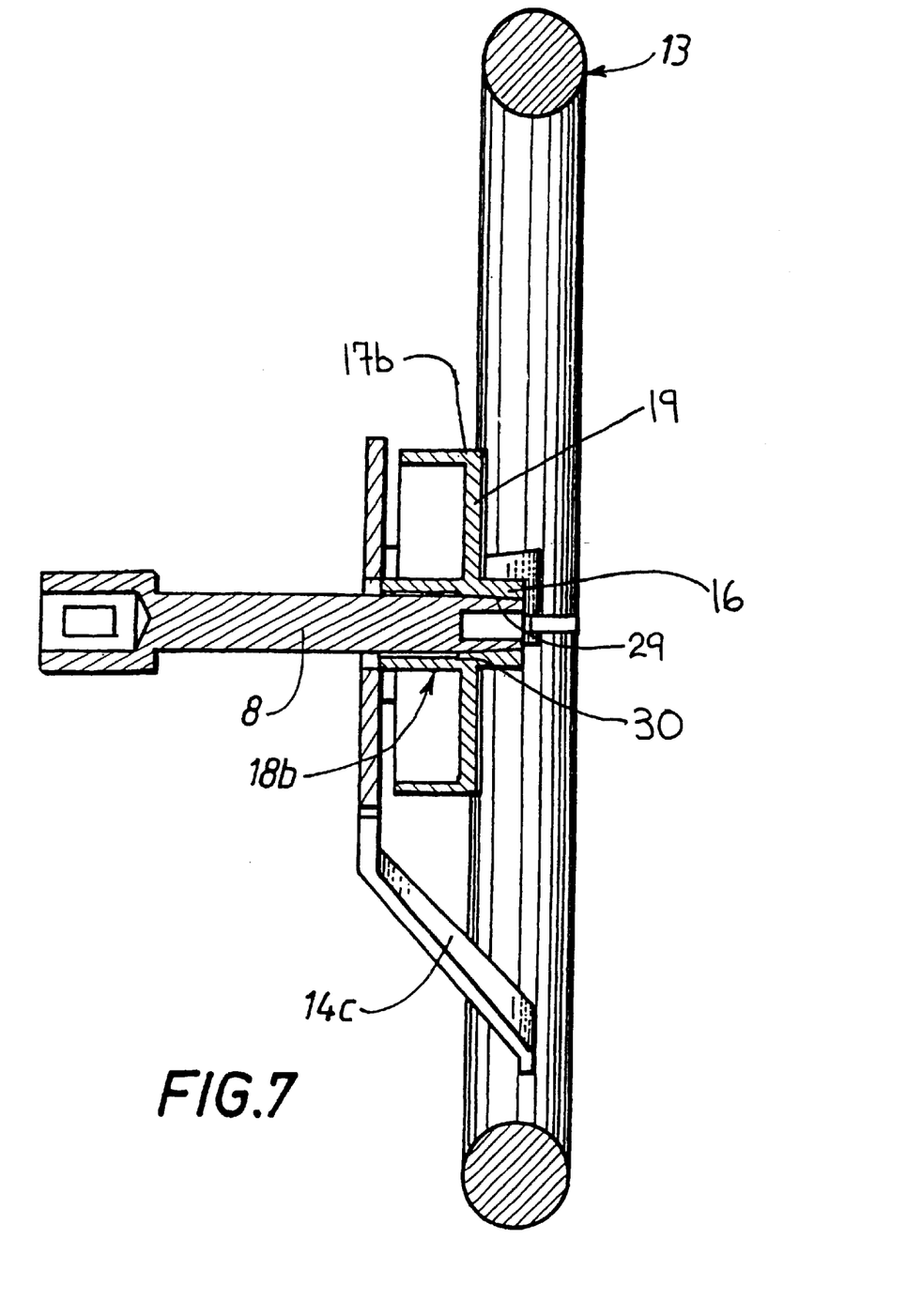
FIG. 7 is a sectional view of FIG. 6.

Screws 15 provide, via the holes 20, the fixing of the hub 10 on the transverse central plate 31 of the frame 14 of the steering wheel 3.

This plate 31 is provided with holes 14b corresponding to the holes 20 in the hub 10.

The frame 14 of the steering wheel has, just as in the embodiments depicted in FIG. 2, a number of inclined arms 14c connecting the transverse central plate 31 to the rim 13 of the steering wheel 3.

When the hub 10 is mounted on a steering wheel 3, in the manner depicted, the deformable outer ring immovably attached to the plate 31 and therefore to the rim 13 of the steering wheel 3 is displaced rotationally with respect to the unstressed outer ring 17b.

Measurement of this small displacement, for example by means of Hall probes 23 placed in the housings 24 and magnets 23' fixed opposite on the plate 31, allows measurement of the torque applied by the driver and allows control of the assistance after processing of the signal by the electronic circuit 12.

This electronic circuit 12 comprises, in one embodiment:

a current input for supplying the Hall probes with power;

a circuit for filtering the signal coming from the probes, in order to eliminate the background noise;

a module providing analogue to digital conversion of the signal;

a module for checking and compensating for drift of the signal emitted by the Hall probes, as a function of the temperature, for example in a range −40° C. to +80° C.;

a security module regularly testing the correct operation of each probe.

As applicable, the electronic circuit 12 has a module making it possible to fix the initiation threshold for the steering assistance, said threshold corresponding to a given torque value, or perhaps a wireless or contactless signal transmission module.

The torque sensors as just depicted with reference to FIG. 2 onwards can, in other embodiments, not be added on to or integrated with the steering wheel, but be placed at any point whatsoever between the steering wheel and the steering column universal joints.

Persons skilled in the art, as will be clearly apparent to them, must take into account the following factors, notably:

any electric assistance motor must be placed before the steering column lock;

the volumes laid down by crash tests (simulated accident tests or impact tests) and the ergonomics of the driving position influence the general size of the steering column 2.

The torque measurement system according to the invention can thus be installed, possibly so as to be removable, at any point on the steering column. This torque measurement system has a sensing element which is robust, rigid, of small dimensions and separable from the geometry of the column.

The potential for standardization is thus increased. The structure of the torque sensor makes it possible to avoid repeated integration studies for the torquemeter depending on the types of column envisaged.

What is claimed is:

1. A vehicle steering column comprising a manual control member (3) for applying a torque on a drive shaft of the column, said column being provided with means for measuring the torque applied to said drive shaft, wherein the means for measuring the torque applied to the drive shaft are formed from an assembly having a certain rigidity comprising:

a displaceable first outer ring (17a);

a second outer ring, substantially unstressed (17b), placed at a distance from the displaceable outer ring (17a);

an inner ring (16) immovably attached rotation-wise to a column (2) on which the 15 torque to be measured is applied, the displaceable outer ring (17a) being capable of being immovably attached rigidly to the manual control member (3) applying the torque to be measured on the column, the displaceable outer ring (17a) being assembled with the inner ring (16) by at least one elastically deformable means (18a, 18b);

the substantially unstressed outer ring (17b) being assembled with the inner ring (16) by at least one substantially unstressed means;

a sensor comprising means for measuring (23) the small relative displacement of the displaceable outer ring (17a) with respect to the substantially unstressed outer ring (17b) when a torque is applied on the column (2) by a means (5); and wherein the displaceable ring (17a), the substantially unstressed outer ring (17b) and the inner ring (16) are made in one piece with their connecting elements (18a, 18b, 19), the substantially unstressed outer ring (17b) carrying the means of measuring (23).

2. A vehicle steering column according to claim 1 wherein the elastically deformable means linking the displaceable first outer ring (17a) and the inner ring (16) includes a brace (18a) extending radially from the inner ring (16) to the displaceable outer ring (17a).

3. A vehicle steering column according to claim 2 wherein a plurality of elastically deformable braces (18a) extend radially from the inner ring (16) to the displaceable first outer ring (17a).

4. A vehicle steering column according to claim 1 wherein the substantially unstressed means linking the substantially unstressed second outer ring (17b) and the inner ring (16) is a brace (19) extending radially from the inner ring (16) to the substantially unstressed second outer ring (17b).

5. A vehicle steering column according to claim 1 wherein the elastically deformable means linking the displaceable outer ring (17a) to the inner ring (16) is a tube deformable torsion-wise (18b).

6. A vehicle steering column according to claim 5 wherein the substantially unstressed means linking the second outer ring (17b) to the inner ring (16) is a brace (19) extending radially from the inner ring (16) to the displaceable outer ring (17b).

7. A vehicle steering column according to claim 6 wherein two radial braces (19) disposed along a diameter of the substantially unstressed outer ring (17b) connect to the inner ring (16).

8. A vehicle steering column according to claim 1 wherein the means for measuring the small relative displacement of the displaceable first outer ring (17a) with respect to the substantially unstressed second outer ring (17b) are optical detectors, electromagnetic detectors, or capacitive detectors.

9. A vehicle steering column according to claim 8 wherein the measuring means comprise at least one Hall effect probe (23) disposed in a housing in the substantially unstressed second outer ring (17b).

10. A vehicle steering column according to claim 1 wherein the means for measuring the torque applied to the drive shaft are disposed, so as to be removable, in the frame of the manual control member.

11. A vehicle steering column according to claim 10 wherein the manual control member is a steering wheel provided with a rim at the stress measuring means.

12. A steering column according to claim 1 including a rotary connector fitted on the drive shaft of the column, said rotary connector allowing the connection between an electronic circuit (12) of the torque sensor and a steering assistance means.

13. A steering column according to claim 12 including an air-bag casing, the rotary connector serving as the connector for the air-bag casing.

14. A vehicle steering column according to claim 1 being of a decoupled type.

15. A vehicle steering column according to claim 1 including a steering box converting the rotating movement of the drive shaft into angular displacement of a steering rod which brings about turning of wheels.

16. A vehicle steering column according to claim 15 including assistance means whose initiation depends notably on the torque applied to the drive shaft by operation of the control member.

17. A vehicle steering column according to claim 16 including assistance calculation means sending signals to a means for controlling the assistance means, depending on the turning torque applied to the drive shaft.

* * * * *